(12) United States Patent
Krogenes et al.

(10) Patent No.: US 10,866,339 B2
(45) Date of Patent: Dec. 15, 2020

(54) APPARATUS AND METHOD FOR MONITORING CONDITIONS IN A FLUID RESERVOIR

(71) Applicants: Industrial Controls AS, Sandnes (NO); WPC Wireless Power and Communication AS, Kristiansand (NO)

(72) Inventors: Kåre Olav Krogenes, Haugesund (NO); Jan Erik Skjold, Stavanger (NO); Geir Olav Gyland, Kristiansand (NO)

(73) Assignees: Industrial Controls AS, Sandnes (NO); WPC Wireless Power and Communication AS, Kristiansand (NO)

( * ) Notice: Subject to any disclaimer, the term of this patent is extended or adjusted under 35 U.S.C. 154(b) by 183 days.

(21) Appl. No.: 16/079,312

(22) PCT Filed: Mar. 15, 2017

(86) PCT No.: PCT/NO2017/050070
§ 371 (c)(1),
(2) Date: Aug. 23, 2018

(87) PCT Pub. No.: WO2017/160164
PCT Pub. Date: Sep. 21, 2017

(65) Prior Publication Data
US 2019/0056526 A1 Feb. 21, 2019

(30) Foreign Application Priority Data
Mar. 16, 2016 (NO) .................................. 20160443

(51) Int. Cl.
*G01V 11/00* (2006.01)
*G01D 21/00* (2006.01)
*H01F 38/14* (2006.01)

(52) U.S. Cl.
CPC ........... *G01V 11/002* (2013.01); *G01D 21/00* (2013.01); *H01F 38/14* (2013.01)

(58) Field of Classification Search
CPC ........ G01D 21/00; G01V 11/002; H01F 38/14
See application file for complete search history.

(56) References Cited

U.S. PATENT DOCUMENTS

| | | | |
|---|---|---|---|
| 2,077,507 A | 4/1937 | Yancey | |
| 2,250,244 A | 7/1941 | Yancey | |

(Continued)

FOREIGN PATENT DOCUMENTS

| | | |
|---|---|---|
| EP | 2960911 | 12/2015 |
| NO | 333416 | 9/2009 |

(Continued)

OTHER PUBLICATIONS

Norwegian Search Report, Norwegian Patent Application No. 20160443, dated Sep. 16, 2016.

(Continued)

*Primary Examiner* — John Fitzgerald
(74) *Attorney, Agent, or Firm* — Andrus Intellectual Property Law, LLP

(57) ABSTRACT

Apparatuses and methods are for monitoring conditions in a fluid reservoir while sealing a passage between the fluid reservoir and an adjacent environment. A first assembly has a primary barrier in fluid communication with the fluid reservoir and adapted to block the passage between the fluid reservoir and the adjacent environment. A second assembly has a secondary barrier in fluid contact with the adjacent environment and adapted to block the passage between the fluid reservoir and the adjacent environment. A first inductive communication means is placed in the first assembly and a second inductive communication means is placed on an opposite side of the secondary barrier. The respective (Continued)

communication means are arranged to communicate with each other. A monitoring means is in fluid communication with the fluid reservoir and transfers information to the first inductive communication means for transferring data gathered from monitoring conditions in the fluid reservoir.

12 Claims, 5 Drawing Sheets

(56) References Cited

U.S. PATENT DOCUMENTS

| | | | |
|---|---|---|---|
| 3,899,243 A * | 8/1975 | Haverkamp | C10J 3/72 359/894 |
| 4,215,458 A | 8/1980 | Lancaster | |
| 4,537,071 A | 8/1985 | Waterman | |
| 5,000,580 A * | 3/1991 | Leininger | G01J 5/0014 356/44 |
| 5,709,337 A * | 1/1998 | Moser | G01L 19/0084 228/124.6 |
| 6,457,367 B1 | 10/2002 | Behm et al. | |
| 7,497,123 B1 * | 3/2009 | Behm | F28F 13/00 73/706 |
| 9,707,807 B2 * | 7/2017 | Summers | H01F 38/14 |
| 9,772,246 B2 * | 9/2017 | Hoffman | G01L 19/0681 |
| 2005/0279499 A1 | 12/2005 | Tarvin et al. | |
| 2007/0018848 A1 * | 1/2007 | Bottos | E21B 47/13 340/854.4 |
| 2007/0279173 A1 | 12/2007 | Scholz et al. | |
| 2010/0101786 A1 | 4/2010 | Lovell et al. | |
| 2010/0307254 A1 * | 12/2010 | Klosinski | G01L 19/0663 73/756 |
| 2013/0005372 A1 * | 1/2013 | Strei | F28D 15/0275 455/500 |
| 2014/0090476 A1 * | 4/2014 | Miller | G01L 19/0618 73/706 |
| 2014/0266210 A1 | 9/2014 | Godager | |
| 2015/0007976 A1 | 1/2015 | Godager | |
| 2015/0059472 A1 | 3/2015 | McHugh et al. | |
| 2015/0375579 A1 * | 12/2015 | Summers | H01F 27/2823 301/5.1 |

FOREIGN PATENT DOCUMENTS

| | | |
|---|---|---|
| WO | 2003/016673 | 2/2003 |
| WO | 2014/018010 | 1/2014 |

OTHER PUBLICATIONS

International Search Report, PCT/NO2017/050070, dated Jul. 6, 2017.
Written Opinion, PCT/NO2017/050070, dated Jul. 6, 2017.
International Preliminary Report on Patentability and Reply, PCT/NO2017/050070, dated Feb. 28, 2018.

* cited by examiner

APPARATUS AND METHOD FOR MONITORING CONDITIONS IN A FLUID RESERVOIR

CROSS-REFERENCE TO RELATED APPLICATIONS

This application is the U.S. national stage application of International Application PCT/NO2017/050070, filed Mar. 15, 2017, which international application was published on Sep. 21, 2017, as International Publication WO 2017/160164 in the English language. The International Application claims priority of Norwegian Patent Application No. 20160443, filed Mar. 16, 2016. The international application and Norwegian application are both incorporated herein by reference, in entirety.

FIELD

The invention relates to an apparatus and a method for monitoring conditions in a fluid reservoir while sealing a passage between said fluid reservoir and an adjacent environment. More specifically the invention relates to an apparatus comprising a primary and a secondary barrier, monitoring means for monitoring the conditions in a fluid reservoir, and communication means for transferring the obtained information through the two barriers. The invention further relates to a method for using the apparatus, and for safe, practical and simple installation and extraction of the apparatus, or parts of the apparatus, without the need for any tools specially designed for the purpose.

BACKGROUND

In chemical, pharmaceutical and petroleum industries, potentially harmful and/or hazardous fluids are produced, extracted, transported, handled and stored. Safe management and containment of such fluids avoiding spillage or leakage is a primary safety objective.

In the petrochemical industry, industry regulations and standards commonly state that no single failure shall lead to an uncontrolled event. Hence, there is a demand for dual barriers on all fluid paths leading from fluid-containing pressure vessels, such as tanks or tubular elements, to the adjacent environment.

As the barriers shall remain uncompromised even in the event of exposure to a surrounding fire, there is a common requirement that all items forming barriers are made from metal, that there are no penetrations in the metal barriers, and that seals formed between different parts of the barriers are made by direct metal-to-metal contact.

At the same time, there is a requirement for monitoring the conditions in a fluid reservoir behind the barriers without compromising the barriers, meaning that data should be transferred through both barriers without penetrations through the barriers.

The means and procedures for inserting and/or extracting a permanent or temporary primary barrier plug into a passage leading to a fluid containing vessel is common knowledge to a person skilled in the art of process design and instrumentation, and/or petroleum production. It is extensively documented in literature, and described in e.g. U.S. Pat. Nos. 2,077,507, 2,250,244, 4,215,458, 4,537,071 and WO 03/016673 A1.

An apparatus and a method for monitoring fluid conditions in a production wellhead are described in NO 333416 B1. The patent describes a sensor placed within a penetrating bore as part of a barrier. As this barrier functions as a primary barrier, installation, retrieval and/or replacement of the sensor involves a significant level of risk, thus making the actions fairly complicated and time consuming.

Furthermore, US 2005/279499 A1, describes a downhole sampling tool and method for using the sampling tool, and US 2014/266210 A1 describes an apparatus and methods of communication with wellbore equipment.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect, the invention relates more particularly to an apparatus for monitoring conditions in a fluid reservoir while sealing a passage between said fluid reservoir and an adjacent environment, the apparatus being arranged to receive power from a main power source, the apparatus comprising:
  a first assembly comprising a primary barrier, wherein the first assembly is adapted to be in fluid communication with the fluid reservoir in operational use of the apparatus and wherein the primary barrier is adapted to block the passage between the fluid reservoir and the adjacent environment, the primary barrier comprising a continuous, non-penetrated sealing portion;
  a second assembly comprising a secondary barrier, wherein the second assembly is adapted to be in fluid contact with the adjacent environment in operational use of the apparatus and wherein the secondary barrier is adapted to block the passage between the fluid reservoir and the adjacent environment, the secondary barrier comprising a continuous, non-penetrated sealing portion, the apparatus further comprising:
  a first inductive communication means placed in the first assembly;
  a second inductive communication means adapted to be placed on an opposite side of the secondary barrier relative to the first communication means, the first inductive communication means and the second inductive communication means being arranged to communicate with each other; and
  a monitoring means arranged to be in fluid communication with the fluid reservoir for monitoring conditions in the fluid reservoir, the monitoring means further being arranged to transfer information to the first inductive communication means for transferring data gathered from monitoring conditions in the fluid reservoir.

There is also described an apparatus for monitoring conditions in a fluid reservoir while sealing a passage between said fluid reservoir and an adjacent environment. The apparatus is arranged to receive power from a main power source. The apparatus comprises a primary barrier adapted to be in fluid communication with the fluid reservoir in operational use of the apparatus, and a secondary barrier adapted to be in fluid contact with the adjacent environment in operational use of the apparatus. Both the primary barrier and the secondary barrier comprise a continuous, non-penetrated sealing portion. The apparatus further comprises a first inductive communication means and a second inductive communication means. The first inductive communication means is placed in the primary barrier. The second inductive communication means is adapted to be placed in the vicinity of the secondary barrier in the adjacent environment. The first inductive communication means and the second inductive communication means are arranged to communicate with each other. The apparatus further comprises a monitoring means adapted to be in fluid communication with the reservoir in operational use of the apparatus, for monitoring conditions in the fluid reservoir. The monitoring means is further arranged to transfer information to the first inductive communication means, for transferring data gathered from monitoring conditions in the fluid reservoir.

The main power source may be external from the apparatus, or the apparatus may comprise the main power source.

The monitoring means may be a transducer, a sensor or a transmitter. It may be a monitoring means for monitoring pressure, for monitoring temperature, for monitoring fluid density, or any other relevant fluid characteristic that may be measured by the use of such means.

The second inductive communication means may be wound around a portion of the second assembly, or otherwise fixed to and/or connected to the second assembly. The second inductive communication means may be placed near but not in contact with other parts of the second assembly, in the adjacent environment. The second assembly may comprise a cover, adapted to be fixed onto at least a portion of the second assembly on the side of the secondary barrier facing the adjacent environment. The side of the secondary barrier facing the adjacent environment may be called an outside of the secondary barrier. The cover may be adapted to be fixed onto a portion of the secondary assembly arranged with the second communication means, such that the cover covers the second communication means from the adjacent environment. The cover may be arranged with an opening through which a line, such as a wire or cable or similar, may extend from the second communication means to a receiver, to transfer signals to and/or from the second communication means from and/or to the receiver. The cover may be welded to the secondary barrier or otherwise fixed to the secondary barrier. The cover may cover a processing unit. The processing unit may be connected to the second inductive communication means.

The cover may comprise a compartment housing that may act as a housing for electronics. The compartment housing may house the processing unit. A cable may extend through a wall of the compartment housing, or through any other wall of the cover, separating an inside of the cover from an outside of the cover, for connecting electronics of the apparatus to other systems or apparatuses for communication.

The second assembly may comprise an aerial. The aerial may be connected to the processing unit of the second assembly. The aerial may extend through a wall of the compartment housing, or through any other wall of the cover, separating an inside of the cover from an outside of the cover, for connecting electronics of the apparatus to other systems or apparatuses for communication.

The cover may comprise a lid covering an opening in the cover. The lid may be opened for accessing the processing unit or other items that may be accessible through the opening. The lid may be water tight, airtight or both.

The first and/or the second inductive communication means, and/or any further inductive communication means, may be covered by, moulded into or otherwise protected by a protective layer of a protective material. The protective material may be a plastic material, epoxy, a rubber material, or any other material suitable for the purpose.

It may be said that a chamber between the secondary barrier and the cover of the second assembly is part of the adjacent environment.

The inductive communication means may be arranged to communicate data, and/or they may be arranged to transfer electric power.

The inductive communication means may comprise at least one transformer winding.

The inductive communication means may further comprise an electronic circuit. The electronic circuit may constitute means for interpreting and/or translating data, e.g. translating data from analogue to digital signals or from digital to analogue signals. The electronic circuit may further constitute a control unit for the inductive communication means.

The typical distance between two inductive communication means arranged to communicate with each other may be in the region of 6 mm to 25 mm, but distances shorter than 6 mm and greater than 25 mm are also possible.

The invention's ability to monitor conditions on one side of a double barrier and to communicate data to the other side of the double barrier makes it comparably safer than an apparatus that has the ability to do the same but with a single barrier. The invention may satisfy requirements that a single-barrier apparatus may not.

The first assembly may comprise a processing unit for processing data. The processing unit may be used to process data from the monitoring means prior to sending said data to the first communication means, and the processing unit may be used to process data received by the first communication means sent from the second communication means or from other sources. By comprising a processing unit, the first assembly may be remotely controlled. Furthermore, the second assembly may comprise a processing unit. The aforementioned electronic circuit may constitute the processing unit. The second inductive communication means may be connected to the processing unit of the second assembly. The processing unit of the second assembly may be adapted to be placed near the second inductive communication means, and arranged with or in connection with communication means for communicating with a receiver placed or adapted to be placed remotely from the second assembly. The second inductive communication means may be connected to a processing unit placed or adapted to be placed remotely from the second assembly.

Each of the primary barrier and the secondary barrier may constitute a physical barrier, adapted to block a passage between a fluid reservoir and an adjacent environment. The continuous, non-penetrated sealing portion of the primary barrier may constitute the primary barrier, or it may form a portion of the primary barrier. The continuous, non-penetrated sealing portion of the secondary barrier may constitute the secondary barrier, or it may form a portion of the secondary barrier. A continuous, non-penetrated sealing portion refers to a piece of material capable of blocking a passage of fluids, wherein the piece of material in its entirety is free from penetrations, such as bores or holes. The primary barrier and/or the secondary barrier may comprise a plurality of continuous, non-penetrated sealing portions. One or more sealing portions may be made from metal. The primary barrier and/or the secondary barrier may be made such that it only comprises continuous, non-penetrated sealing portions. In a preferred embodiment, both the primary and the secondary barrier may be made from a plurality of continuous, non-penetrated, metal sealing portions, each portion forming a metal-to-metal seal to any other portion of the respective barrier to which it is connected. Thus, both the primary barrier and the secondary barrier may satisfy requirements for barriers used in the petrochemical industry, as described previously in this text.

The first assembly may comprise an instrument housing. The instrument housing may be housing instruments, such as a monitoring means, an inductive communication means, an electronic circuit and/or a battery. The instrument housing may further comprise other instruments.

The first assembly may further comprise a tool handle. The purpose of the tool handle is to make the first assembly easier to handle, e.g. for installing the first assembly into a passage between a fluid reservoir and an adjacent environment, for extracting the first assembly, or for extracting parts of the first assembly. The tool handle may be detachable from the first assembly.

Furthermore, the first assembly may comprise a plug. The plug may constitute the primary barrier. The plug may be detachable from other parts of the first assembly. By equipping the first assembly with a detachable plug, it is possible to extract the first assembly's instrument housing and/or tool handle from a passage between a fluid reservoir and an adjacent environment in which it is set, while still leaving the plug in place to provide a barrier in the passage. Other parts of the first assembly, such as the tool handle and the instrument housing, may also be detachable from each other.

The plug may be adapted to be fixed to a side of the instrument housing of the first assembly that may be adapted to receive the plug. Equally, the plug may be adapted to receive the instrument housing. Furthermore, the plug may be arranged with a bore through which fluid may flow. The monitoring means adapted to be in fluid communication with the reservoir may be arranged on a surface on the side of the instrument housing that may be adapted to receive the plug. The bore may constitute a flow path for a fluid from a fluid reservoir to the monitoring means, thus the bore may constitute a part of the fluid reservoir, thus allowing the monitoring means to monitor conditions in the fluid reservoir.

The plug arranged with a bore may further comprise a closing means in the bore, for opening or closing a flow path. By comprising a closing means for closing a flow path, the plug may act as a stand-alone barrier. This means that if a situation arises in which it is desirable to extract the instrument housing, e.g. for maintenance, it is possible to leave the plug in place to act as a barrier while extracting other parts of the apparatus.

Having the possibility of leaving a part of the apparatus in place as a barrier when needing to extract other parts of the apparatus renders the apparatus even more advantageous. With this possibility, if e.g. maintenance work has to be done on the apparatus, it will not be necessary to extract the entire apparatus. There will be an option of leaving a barrier in place during the maintenance work, ensuring that the work will be safer and less time-consuming. Without this option, another barrier would most likely have to be installed during the maintenance work.

The closing means may be any means suitable for the purpose, such as a ball valve, a needle valve, an actuated check valve or a plug.

The closing means may be actuated by the attachment and/or detachment of the plug to an instrument housing. The closing means may open, and thus open a flow path, when the plug is attached to an instrument housing. The closing means may close, and thus close a flow path, when the plug is detached from an instrument housing. Likewise, the closing means may be actuated by the attachment and/or detachment of the plug to other parts, such as a tool handle.

The bore may comprise more than one possible flow path, and each path may comprise a closing means. By comprising several possible flow paths that can be opened or closed, the bore may be equipped to function as a block, block and bleed, double block and bleed, block and double bleed, or any other relevant combination of block and bleed. Blocking refers to closing a flow path, while bleeding refers to opening for bleeding off, i.e. letting a fluid out e.g. for relieving pressure.

The first assembly may comprise a backup power source. The backup power source may act as a backup if for some reason other means of supplying power fails, or as a support power source in addition to other means of supplying power. The backup power source may be a battery.

Other means of supplying power to the first assembly may be by transferring power from the second inductive communication means to the first inductive communication means, or by use of other inductive means. Power transferred from the second inductive communication means to the first inductive communication means may be power from the main power source.

The apparatus may comprise more than one instrument housing. Furthermore, the apparatus may comprise more than one inductive communication means in the first assembly, and more than one inductive communication means adapted to be placed on an opposite side of the secondary barrier relative to the first inductive communication means. The apparatus may further have more than one processing unit for processing data in the first assembly, and/or it may have more than one power source in the first assembly.

Different parts of the first assembly, such as the plug, a first instrument housing, a second instrument housing and/or a tool handle, may be equipped with locking means for allowing the parts to be rotationally locked together. The locking means may comprise a seal groove and a seal for ensuring that the parts may be joined together in a pressure tight lock. The different parts of the first assembly may be arranged with a vent port to lead fluid from the locking means to a chamber between the primary barrier and the secondary barrier, for ensuring that two parts are not stopped from locking sufficiently together by fluid caught in between the two parts. The vent port may further constitute a flow path from a chamber to a monitoring means.

The rotational locking mechanism may be a normal rotational locking mechanism, wherein one part has a protruding end portion that fits into a receiving end portion of another part, and wherein a rotational movement forces and eventually fixes the two parts together. A plug may comprise a receiving rotational locking mechanism portion and/or a protruding rotational locking mechanism portion, an instrument housing may comprise a receiving rotational locking mechanism portion and/or a protruding locking rotational locking mechanism portion, and a tool handle may comprise a receiving rotational locking mechanism portion and/or a protruding rotational locking mechanism portion.

The second assembly may comprise a leak-off port for releasing fluid from a chamber between the secondary barrier and a structure. The structure may be a structure to which the first assembly is fixed and/or the structure may be the first assembly. The leak-off port may further function as a pressure-test port.

The second assembly may further comprise a seal groove, for receiving a seal. The apparatus may comprise said seal, for in combination with the seal groove to ensure that the second assembly may be locked to a structure in a pressure tight manner.

The apparatus may comprise a second monitoring means. The second monitoring means may be arranged to monitor conditions in a chamber between the primary barrier and the secondary barrier. The apparatus may have further monitoring means arranged to monitor conditions in the fluid reservoir, and/or the apparatus may have further monitoring means adapted to monitor conditions in the chamber between the primary barrier and the secondary barrier.

Adding a second instrument housing, a third inductive communication means placed in the second instrument housing, and a second monitoring means arranged to monitor conditions in the chamber between the primary barrier and the secondary barrier and arranged to transfer data to the third inductive communication means, will allow the apparatus to monitor conditions in the chamber between the primary barrier and the secondary barrier and to communicate the findings out into a receiver in the adjacent environment, while maintaining the previously mentioned capabilities of monitoring the conditions in the fluid reservoir while providing a double barrier in the passage between the fluid reservoir and the adjacent environment, with the barriers satisfying aforementioned requirements.

The apparatus may constitute a safety-instrumented system. Adding a second and a third instrument housing, each comprising inductive communication means and a monitoring means arranged to monitor conditions in a chamber between the primary barrier and the secondary barrier, will allow the apparatus to satisfy requirements for a safety integrity level 3 system, as outlined in IEC 61 508, IEC 61 511 and OLF 070.

In a second aspect, the invention relates more particularly to use of the apparatus in the first aspect of the invention for sealing a passage between a fluid reservoir and an adjacent environment.

In a third aspect, the invention relates more particularly to a method of monitoring conditions in a fluid reservoir while sealing a passage between said fluid reservoir and an adjacent environment, the method comprising the steps of installing the apparatus in the passage between a fluid reservoir and an adjacent environment, obtaining information about conditions in a fluid reservoir by use of the first monitoring means, and transferring the obtained information inductively through a dual barrier by use of the first inductive communication means as a sending unit and the second inductive communication means as a receiving unit.

The installation step of the method may comprise the step of inserting and setting a plug into a passage between a fluid reservoir and an adjacent environment by use of commonly known procedures for plug insertion. The method may further comprise the step of attaching an instrument housing to the plug and opening a bore in the plug, by opening a closing means in the bore, to create a flow path from the fluid reservoir to a monitoring means. Furthermore, the method may comprise the step of installing a secondary barrier. The secondary barrier may be the secondary barrier of the second assembly according to the first aspect of the invention.

The method may further comprise the steps of removing the secondary barrier, closing a bore in a plug for the plug to act as a barrier between the fluid reservoir and the adjacent environment, detaching the instrument housing from the plug, extracting all parts of the apparatus except the plug and all parts of the plug, attaching an instrument housing to the plug, opening a flow path through the bore in the plug by opening a closing means in the bore to create a path from the fluid reservoir to the monitoring means, and installing the secondary barrier. The bore may be closed by closing a closing means in the bore. This method may be applied e.g. if the instrument housing needs to be removed for replacing the monitoring means. The method allows for leaving a barrier in place between the fluid reservoir and the adjacent environment during maintenance work to the apparatus.

It is to be understood that the plug and/or the first assembly, when set in the passage between the fluid reservoir and the adjacent environment, may extend into the fluid reservoir and/or the adjacent environment from the passage.

BRIEF DESCRIPTION OF THE DRAWINGS

In the following are described examples of preferred embodiments illustrated in the accompanying drawings, wherein.

Note that the drawings are shown highly simplified and schematic and that the various features therein are not necessarily drawn to scale. Identical reference numerals refer to identical or similar features in the drawings.

DETAILED DESCRIPTION OF THE DRAWINGS

Figure 1:
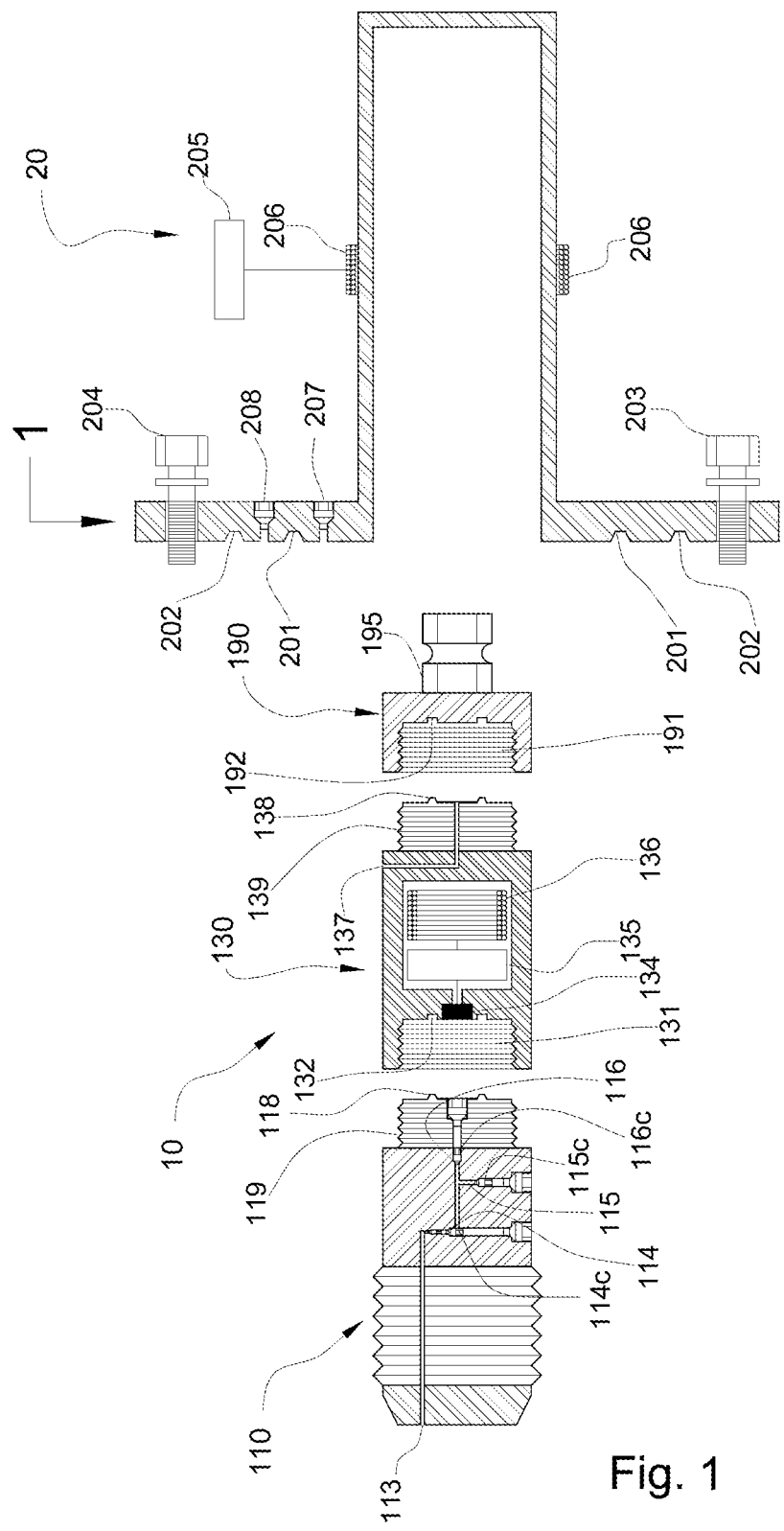
FIG. 1 shows a plug, an instrument housing, a tool handle and a second assembly.

FIG. 1 illustrates parts of the apparatus 1 by showing a second assembly 20 and a disassembled embodiment of the first assembly 10. The second assembly 20 is shown here with two seal grooves 201, 202, two pressure-test/leak-off ports 207, 208, a second inductive communication means 206 fixed to the second assembly 20, a processing unit 205 connected to the second inductive communication means 206, and two bolts 203, 204 for fixing the secondary barrier 20 to a structure.

The second assembly 20 is substantially cylinder shaped. The two seal grooves 201, 202 are circular, and thus shown twice each in the figure. The second inductive communication means 206 are winded circumferentially around a portion of the second assembly 20. It should be noted that this represents one embodiment, and that other shapes are possible for the second assembly 20, with other solutions for the seal grooves 201, 202 and the second inductive communication means 206.

The first assembly 10 is shown in a partly exploded view in FIG. 1, the first assembly 10 comprising a plug 110, an instrument housing 130 and a tool handle 190.

The plug 110 comprises a bore 113, a protruding rotational locking mechanism portion 119, a seal 118, a transducer port 116, a bleed port 115, and a process port 114.

Each of the three ports 114, 115, 116 are arranged with a closing means 114c, 115c, 116c, for opening or closing a flow path to the port.

The instrument housing 130 comprises a seal groove 132, a transducer 134, a receiving rotational locking mechanism portion 131, a processing unit 135, a first inductive communication means 136, a vent port 137, a seal 138, and a protruding rotational locking mechanism portion 139.

The tool handle 190 comprises a receiving rotational locking mechanism portion 191, a seal groove 192, and a handle 195.

The first inductive communication means 136 is arranged to communicate with the second inductive communication means 206. The seals 118, 138 are adapted to fit into the seal grooves 132, 192. The protruding rotational locking mechanism portion 119 is arranged to fit into the receiving rotational locking mechanism portion 131. Likewise, the protruding rotational locking mechanism portion 139 is arranged to fit into the receiving rotational locking mechanism portion 191.

The transducer 134 is arranged to be in contact with a fluid reservoir through the bore 113 and the transducer port 116 in the plug 110. The bleed port 115 is included in the plug 11 for bleeding off pressure in the bore 113. The process port 114 can block or open the bore 113, thus blocking or opening for fluid to flow through the plug 110.

The two assemblies 10 and 20 in this embodiment are cylindrically shaped.

Figure 2:
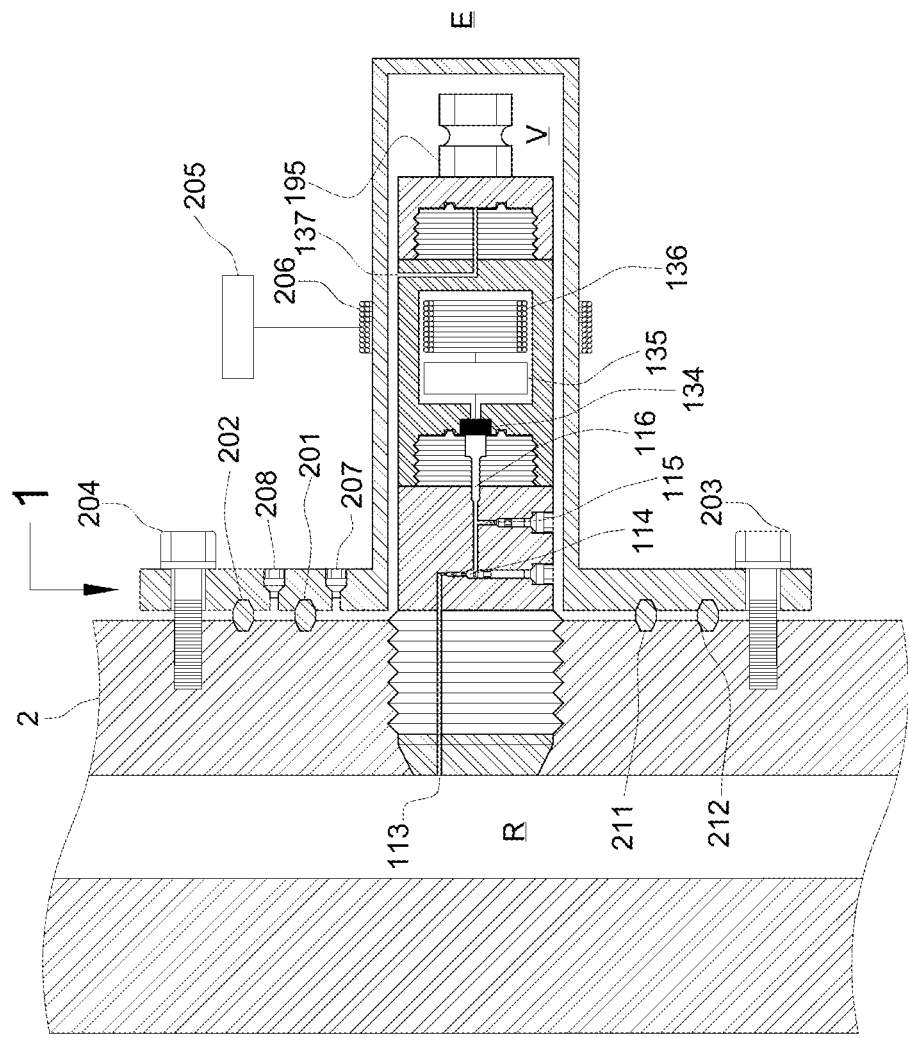
FIG. 2 shows a first assembly, comprising a plug, an instrument housing and a tool handle, set in a passage between a fluid reservoir and an adjacent environment, and a second assembly set as a secondary barrier between the fluid reservoir and the adjacent environment.

FIG. 2 illustrates the apparatus 1 in FIG. 1 assembled and mounted in a structure 2, in a passage between a fluid reservoir R and an adjacent environment E. The apparatus 1 in this embodiment further comprises seals 211, 212 in the seal grooves 201, 202.

It is further illustrated, in FIG. 2, how the second assembly 20 can be placed around a section of the first assembly 10, how the two assemblies 10, 20 can form a dual barrier between a fluid reservoir R and an adjacent environment E, and how a chamber V may be formed between the two barriers. Furthermore, the figure illustrates how the first inductive communication means 136 and the second inductive communication means 206 are arranged sufficiently close to each other to arrange for good conditions for communication, and how the bore 113 in the plug 110 opens a path from the fluid reservoir R to the transducer 134.

Figure 3:
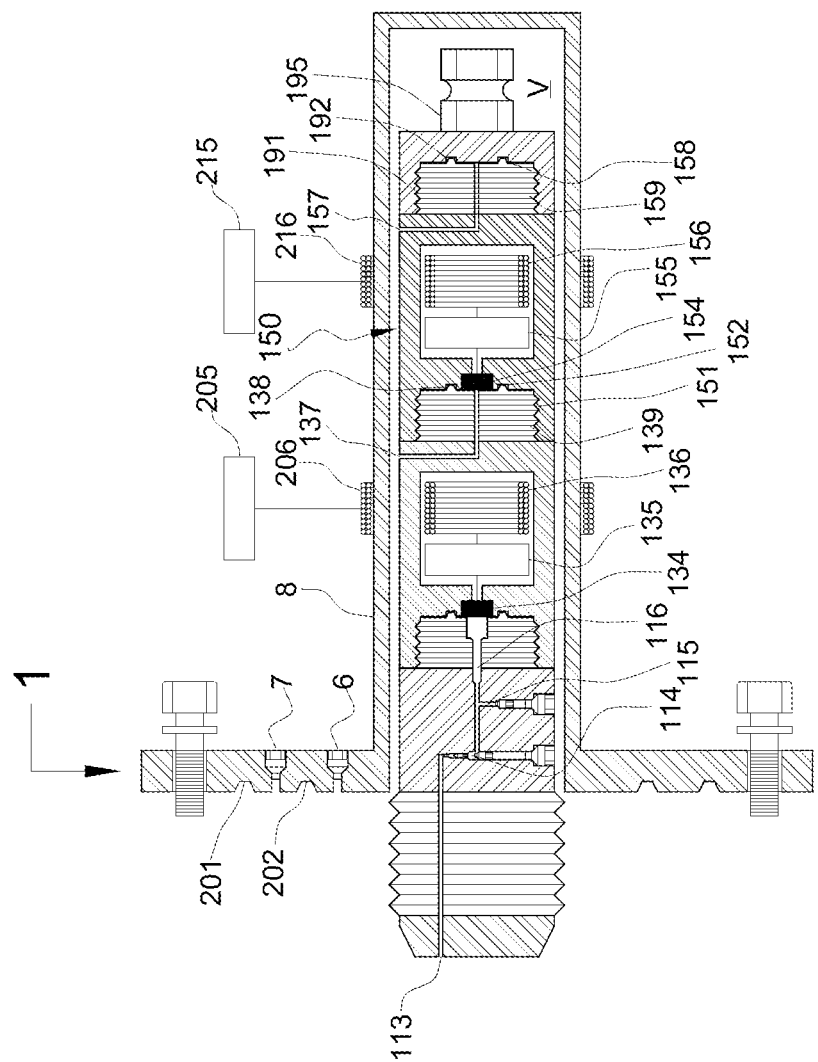
FIG. 3 shows a first assembly comprising a plug, two instrument housings and a tool handle, and a second assembly.

FIG. 3 illustrates the apparatus 1 comprising the same parts as in the two previous illustrations, with some additions. The first assembly 10 in FIG. 3 comprises a second instrument housing 150. The first assembly 10 may be equipped with even further instrument housings 130, 150.

The instrument housing 150 comprises a receiving portion of a rotational locking mechanism 151, a seal groove 152, a transducer 154, a processing unit 155, a third inductive communication means 156, a vent port 157, a seal 158 and a protruding rotational locking mechanism portion 159.

The second assembly 20 in this figure comprises, in addition to parts shown in previous figures, a processing unit 215 and a fourth inductive communication means 216.

The first instrument housing's 130 protruding rotational locking mechanism portion 139 in locked to the second instrument housing's 150 receiving rotational locking mechanism portion 151. The second instrument housing's 150 protruding rotational locking mechanism portion 159 is locked to the tool handle's 190 receiving rotational locking mechanism portion 191.

In this embodiment, featuring two instrument housings 130, 150, the apparatus 1 is equipped with a second monitoring means 154, arranged to be in fluid communication with the chamber V between the two barriers through the vent port 137. This embodiment thus allows for monitoring of conditions in the chamber V. Furthermore, the third inductive communication means 156 is arranged to communicate with the fourth inductive communication means 216, thus enabling inductive communication of data gathered from monitoring the chamber V.

Figure 4:
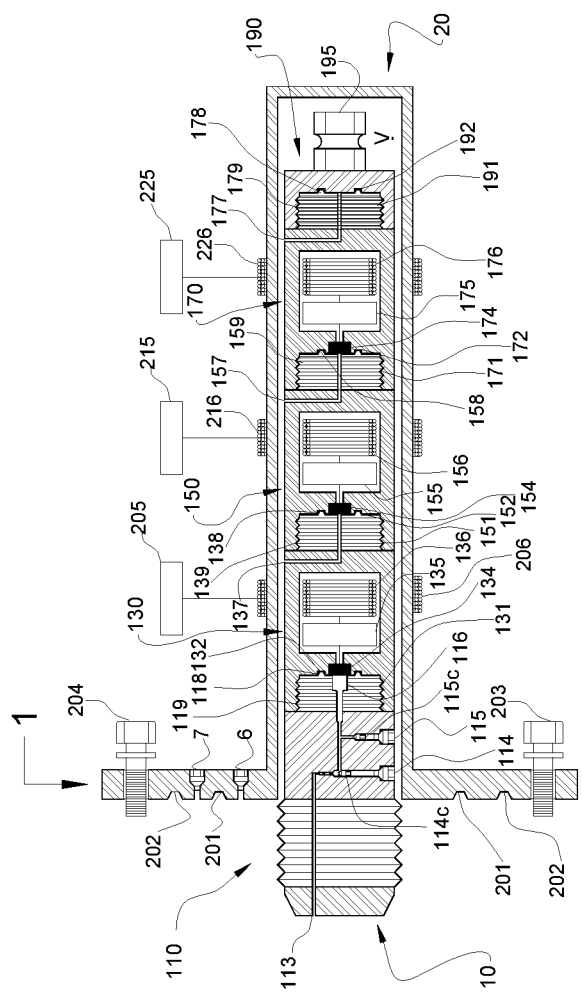
FIG. 4 shows a first assembly comprising a plug, three instrument housings and a tool handle, and a second assembly.

FIG. 4 illustrates the apparatus 1 with the first assembly 10 comprising three instrument housings 130, 150, 170. The third instrument housing 170 comprises a receiving rotational locking mechanism portion 171, a seal groove 172, a transducer 174, a processing unit 175, a fifth inductive communication means 176, a vent port 177, a seal 178 and a protruding rotational locking mechanism portion 179.

The second assembly 20 in this embodiment comprises all the parts from FIG. 3, and additionally a processing unit 225 and a sixth inductive communication means 226.

The third instrument housing 170 is placed between the second instrument housing 150 and the tool handle 190. Thus, the protruding rotational locking mechanism 159 of the second instrument housing 150 is locked with the receiving rotational locking mechanism 171 of the third instrument housing 170, while the receiving rotational locking mechanism 191 of the tool handle 190 is locked with the protruding rotational locking mechanism 179 of the third instrument housing 170.

In FIG. 4, the fifth inductive communication means 176 and the sixth inductive communication means 226 are arranged to communicate with each other. Furthermore, the vent port 157 arranges for fluid communication between the transducer 174 and the chamber V between the two barriers. This embodiment thus has three independent monitoring means 134, 154, 174, each with their own sets of inductive communication means 136, 206; 156, 216; 176, 226. Thus, this embodiment may satisfy the requirements for safety integrity level 3.

Figure 5:
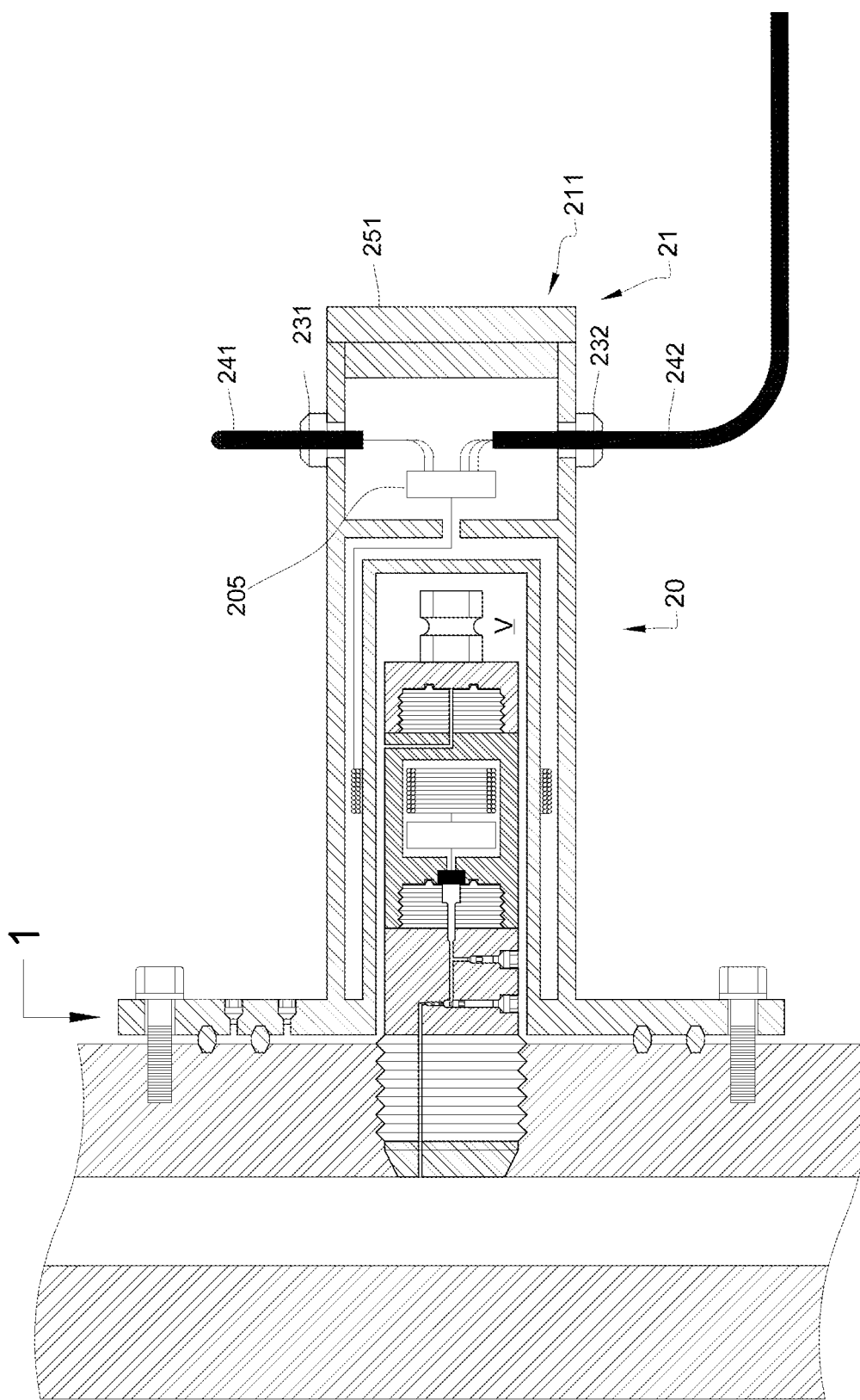
FIG. 5 shows an embodiment of the apparatus wherein the second assembly comprises a cover for covering the second inductive communication means.

FIG. 5 shows a possible embodiment of the apparatus 1, wherein the second assembly 20 comprises a cover 21. The cover 21 comprises a compartment housing 211, and the compartment housing 211 comprises the processing unit 205 of the second assembly 20. The compartment housing 211 comprises a cable 242 extending from the processing unit, via wires, through a wall of the compartment housing 211, to a not shown receiver. The compartment housing 211 further comprises an aerial 241 extending from the processing unit 205, via wires, through a wall of the compartment housing 211. The cable 242 and the aerial 241 are means for connecting the apparatus to other systems or apparatuses for communication. In another embodiment, the compartment housing 211 may typically comprise either an aerial 241 or a cable 242. The compartment housing 211 further comprises a lid 251 that may be opened for accessing equipment in the compartment housing 211.

It is to be understood that equipment not shown in the figures may be connected to the apparatus 1, such as a not shown power source for providing power to the apparatus 1.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. An apparatus for monitoring conditions in a fluid reservoir while sealing a passage between said fluid reservoir and an adjacent environment, the apparatus being arranged to receive power, the apparatus comprising:
   a first assembly comprising a primary barrier, wherein the first assembly is adapted to be in fluid communication with the fluid reservoir in operational use of the apparatus and wherein the primary barrier is adapted to block the passage between the fluid reservoir and the adjacent environment, the primary barrier comprising a continuous, non-penetrated sealing portion;
   a second assembly comprising a secondary barrier, wherein the second assembly is adapted to be in fluid contact with the adjacent environment in operational use of the apparatus and wherein the secondary barrier is adapted to block the passage between the fluid reservoir and the adjacent environment, the secondary barrier comprising a continuous, non-penetrated sealing portion,
   a first inductive communication means placed in the first assembly;
   a second inductive communication means adapted to be placed on the opposite side of the secondary barrier relative to the first inductive communication means, the first inductive communication means and the second inductive communication means being arranged to communicate with each other; and
   a first monitoring means arranged to be in fluid communication with the fluid reservoir for monitoring conditions in the fluid reservoir, the first monitoring means further being arranged to transfer information to the first inductive communication means for transferring data gathered from monitoring conditions in the fluid reservoir.

2. The apparatus according to claim 1, wherein the first assembly comprises a second monitoring means arranged to monitor conditions in a chamber between the primary barrier and the secondary barrier.

3. The apparatus according to claim 1, wherein the first assembly comprises a processing unit for processing data.

4. The apparatus according to claim 1, wherein the second assembly comprises a processing unit for processing data.

5. The apparatus according to claim 1, wherein the first assembly comprises a tool handle.

6. The apparatus according to claim 1, wherein the first assembly comprises a plug.

7. The apparatus according to claim 6, wherein the plug is detachable from the first assembly.

8. The apparatus according to claim 6,
   wherein the plug is adapted to be fixed to a first instrument housing;
   wherein the plug comprises a bore through which fluid may flow;
   wherein the first monitoring means is arranged on an outer surface of the first instrument housing; and
   wherein the bore in the plug is arranged as a flow path for fluids from a fluid reservoir to the first monitoring means, such that the first monitoring means may obtain information about the conditions in the fluid reservoir.

9. The apparatus according to claim 8, wherein the bore in the plug is provided with a closing means for opening or closing the flow path.

10. A method for monitoring conditions in a fluid reservoir while sealing a passage between said fluid reservoir and an adjacent environment, the method comprising steps of:
    providing an apparatus comprising:
       a first assembly comprising a primary barrier, wherein the first assembly is adapted to be in fluid communication with the fluid reservoir in operational use of the apparatus and wherein the primary barrier is adapted to block the passage between the fluid reservoir and the adjacent environment, the primary barrier comprising a continuous, non-penetrated sealing portion;
       a second assembly comprising a secondary barrier, wherein the second assembly is adapted to be in fluid contact with the adjacent environment in operational use of the apparatus and wherein the secondary barrier is adapted to block the passage between the fluid reservoir and the adjacent environment, the secondary barrier comprising a continuous, non-penetrated sealing portion,
       a first inductive communication means placed in the first assembly;
       a second inductive communication means adapted to be placed on the opposite side of the secondary barrier relative to the first inductive communication means, the first inductive communication means and the second inductive communication means being arranged to communicate with each other; and
       a monitoring means arranged to be in fluid communication with the fluid reservoir for monitoring conditions in the fluid reservoir, the monitoring means further being arranged to transfer information to the first inductive communication means for transferring data gathered from monitoring conditions in the fluid reservoir;
    installing the apparatus in the passage between the fluid reservoir and the adjacent environment;
    obtaining information about conditions in the fluid reservoir by use of the monitoring means; and
    transferring the obtained information inductively through a dual barrier by use of the first inductive communication means as a sending unit and the second inductive communication means as a receiving unit.

11. The method according to claim 10, wherein the first assembly comprises a plug, wherein the step of installing the apparatus further comprises steps of:
    inserting and setting the plug into the passage between the fluid reservoir and the adjacent environment by use of commonly known procedures for plug insertion;
    attaching an instrument housing to the plug;
    opening a flow path through a bore in the plug by opening a closing means in the bore, to create a path from the fluid reservoir to the monitoring means; and
    installing a secondary barrier.

12. The method according to claim 10 further comprising steps of:
- removing the secondary barrier;
- closing a bore in a plug, by closing a closing means in the bore, for the plug to act as a barrier between the fluid reservoir and the adjacent environment;
- detaching an instrument housing from the plug;
- extracting all parts of the apparatus except the plug and all parts of the plug;
- attaching an instrument housing to the plug;
- opening a flow path through the bore in the plug by opening a closing means in the bore, to create a path from the fluid reservoir to the monitoring means; and
- installing the secondary barrier.

* * * * *